United States Patent [19]

Warmuth, II

[11] Patent Number: 4,688,774
[45] Date of Patent: Aug. 25, 1987

[54] SIDE LOAD COMPENSATING AIR SUSPENSION

[75] Inventor: Ivan J. Warmuth, II, Akron, Ohio

[73] Assignee: Goodyear Tire & Rubber Company, Akron, Ohio

[21] Appl. No.: 802,144

[22] Filed: Nov. 27, 1985

[51] Int. Cl.$^4$ ............................................. F16F 9/04
[52] U.S. Cl. ........................ 267/64.21; 92/98 D;
    267/35; 267/64.24; 267/152; 280/692; 280/712
[58] Field of Search .............. 267/8 R, 8 B, 8 C, 8 D,
    267/8 A, 9 R, 9 B, 9 A, 9 C, 10, 35, 63 R, 63 A,
    64.21, 64.24, 64.27, 152; 74/18.2; 92/98 D;
    280/692, 698, 712, 668, DIG. 1; 403/50, 51

[56] References Cited

U.S. PATENT DOCUMENTS

| | | | |
|---|---|---|---|
| 2,893,104 | 5/1957 | Hancock | 267/15 R |
| 2,916,296 | 3/1956 | Muller | 280/124 |
| 3,387,856 | 9/1965 | Guilhamat et al. | 280/96.2 |
| 3,954,257 | 5/1976 | Keijzer et al. | 267/65 R |
| 4,067,558 | 1/1978 | Keijzer et al. | 267/34 |
| 4,274,655 | 6/1981 | Lederman | 267/8 R X |
| 4,332,397 | 6/1982 | Steger | 280/693 |
| 4,445,673 | 5/1984 | Clark | 267/64.24 |
| 4,482,135 | 11/1984 | Ishida et al. | 267/8 R |
| 4,493,481 | 1/1985 | Merkle | 267/64.27 |
| 2,980,4421 | 11/1958 | Timpener et al. | 280/124 |

FOREIGN PATENT DOCUMENTS 828606 2/1960 United Kingdom.
830283 3/1960 United Kingdom ............ 267/64.27

OTHER PUBLICATIONS

"MacPherson Strut Suspensions", *Motor Age*, Sep. 1976, pp. 61-64.

*Primary Examiner*—George E. A. Halvosa
*Attorney, Agent, or Firm*—R. D. Thompson

[57] ABSTRACT

A vehicle suspension strut incorporating an airspring around a hydraulic shock absorber is disclosed. The airspring design and orientation relative to the shock absorber axis creates a side acting force which counteracts the bending torque acting on the strut during operation in a vehicle and prevents binding of the shock absorber piston. The horizontal acting side load can be achieved by using an airspring piston eccentrically mounted on the shock absorber. Alternatively the airspring may be mounted offset and/or at an angle to the shock absorber axis. The flexible membrane of the airspring may also be cut in a plane oblique to the shock axis and mounted on the airspring piston to form asymmetric rolling lobes about the circumference of the piston.

7 Claims, 8 Drawing Figures

SIDE LOAD COMPENSATING AIR SUSPENSION

BACKGROUND OF THE INVENTION

This invention relates generally to strut type suspension members which utilize airsprings in conjunction with a damping member contained therein. In particular, conventional hydraulic shock absorbers provide the damping means and rolling lobe type airsprings provide the load support. The geometry used on helical spring strut suspensions for automobiles is such that the vehicle mass produces an angular displacement or torque which causes bending of the strut. This bending moment to the strut causes binding of the shock absorber piston which results in ride harshness. This harshness is pronounced at low amplitude undulation of the vehicle. Conventional helical coil spring MacPherson struts utilize a coil spring that is both offset and set at an angle to the strut axis. This geometry is an attempt to create compensating side loading to oppose the stress placed on the strut by the spring mass of the vehicle.

The helical spring type struts, as represented by a MacPherson strut configuration cannot be adjusted to compensate for increased vehicle load. Thus, as load increases vehicle height decreases. Also, the coil spring is limited to a single or at best a very narrow range of spring rates which requires a design selection between a soft ride and a hard ride.

An object of this invention is to provide a suspension strut utilizing an airspring which generates side load compensating force. This force counteracts the bending torque created by the mass of the vehicle in operation and minimizes stiction in the hydraulic damper of the strut. This yields a softer ride, variable spring rates, also, a constant vehicle height can be maintained regardless of load by adjusting the internal pressure in the airspring portion of the strut.

One embodiment of the invention utilizes a nonsymmetrical or eccentric airspring piston configuration in which the rolling lobe or meniscus of the airspring flexible member on opposing sides of the airspring piston are of unequal axial length. This nonsymmetric configuration creates compensating side load and allows the airspring to be mounted without an offsetting angle to the shock absorber piston rod. This non-offset mounting makes for a space efficient strut configuration. A further advantage of this configuration is that the airspring piston diameter can be maintained at a minimum to provide a low spring rate and softer vehicle ride.

In another embodiment, the airspring acts at an angle to the axis of rotation of strut to create side loading force. Yet another embodiment utilizes a flexible member of the airspring which is of unequal axial length around the circumference of the flexible member which creates side loading when attached to the airspring piston and upper retainer.

BRIEF DESCRIPTION OF THE INVENTION

In a first embodiment of the invention, the flexible member of the the airspring portion is cut in a plane oblique to the axis of the flexible member to create a nonsymmetrical rolling lobe airspring configuration. This embodiment is a suspension strut for connecting a sprung portion and an unsprung portion of a suspension comprising:

(a) a damper means having a rotational axis and including a tubular body having an axially moveable rod extending coaxially outward therefrom, said elongated body of said damper means being connected to said unsprung portion of the suspension and said rod connected to said sprung portion of the suspension at an attachment point; and (b) a nonsymmetrical airspring operatively mounted surrounding said damper means to form a sealed pneumatic working cavity therearound, said nonsymmetrical airspring including an airspring piston sealably attached to said body of the damper means and an upper retainer attached to the rod proximate the sprung portion of the suspension, said upper retainer being axially spaced apart from and connected to said airspring piston by a tubular flexible member having first end cut in a plane perpendicular to an axis of rotation of said flexible member and sealingly attached to said upper retainer and a second end being cut in a non-perpendicular plane to said axis and sealingly attached around said airspring piston proximate the second end of said flexible member.

Another embodiment is a suspension strut for connecting a sprung portion and an unsprung portion of a suspension comprising:

(a) a damper means including a body containing an oil filled reservoir mounted in said body, a piston mounted for coaxial reciprocal movement in said body having a rod connected to said piston extending upwardly from said tubular body, said body being concentric about a rotational axis of said damper means and connected to said unsprung portion of suspension said rod being connected to said sprung portions of the suspension at an attachment point; and (b) a nonsymmetrical airspring operatively mounted surrounding said damper means to form a sealed pneumatic working cavity therearound, said nonsymmetrical airspring including an airspring piston sealingly attached to said body of said damper means such that the airspring piston is eccentrically mounted about the rotational axis of said damper means, and an upper retainer axially spaced apart from said airspring piston by a tubular flexible member, said pneumatic working cavity being formed by a first end of said tubular flexible member being sealably secured to said upper retainer and a second end of said tubular flexible member being sealably secured to said airspring piston, said upper retainer being connected to said rod proximate said sprung portion of said suspension.

Yet another embodiment is a suspension strut for connecting a sprung portion and an unsprung portion of a suspension comprising:

(a) a damper means having a body containing a damping medium, a rotational axis concentric with an axially moveable rod connected on one end to the damping medium of the damper means and on the other end to the sprung portion of the suspension at an attachment point, said body being connected to the unsprung portion of said suspension,;

(b) a symmetrical airspring having a rigid upper retainer connected to said rod proximate said sprung portion of the suspension, an airspring piston symmetrical about a piston rotational axis and a flexible air impervious membrane having a first end sealably attached to said rigid upper retainer and a second end sealably attached to said airspring piston forming a sealed working cavity therebetween and wherein said airspring piston is fixedly attached to said body of said damper means such that the rotational axis of said damper means and the airspring piston rotational axis are positioned to form an acute angle therebetween and to intersect at said attachment point of said rod to said sprung portion of said suspension.

DETAILED DESCRIPTION OF THE INVENTION

Figures 1, 2:
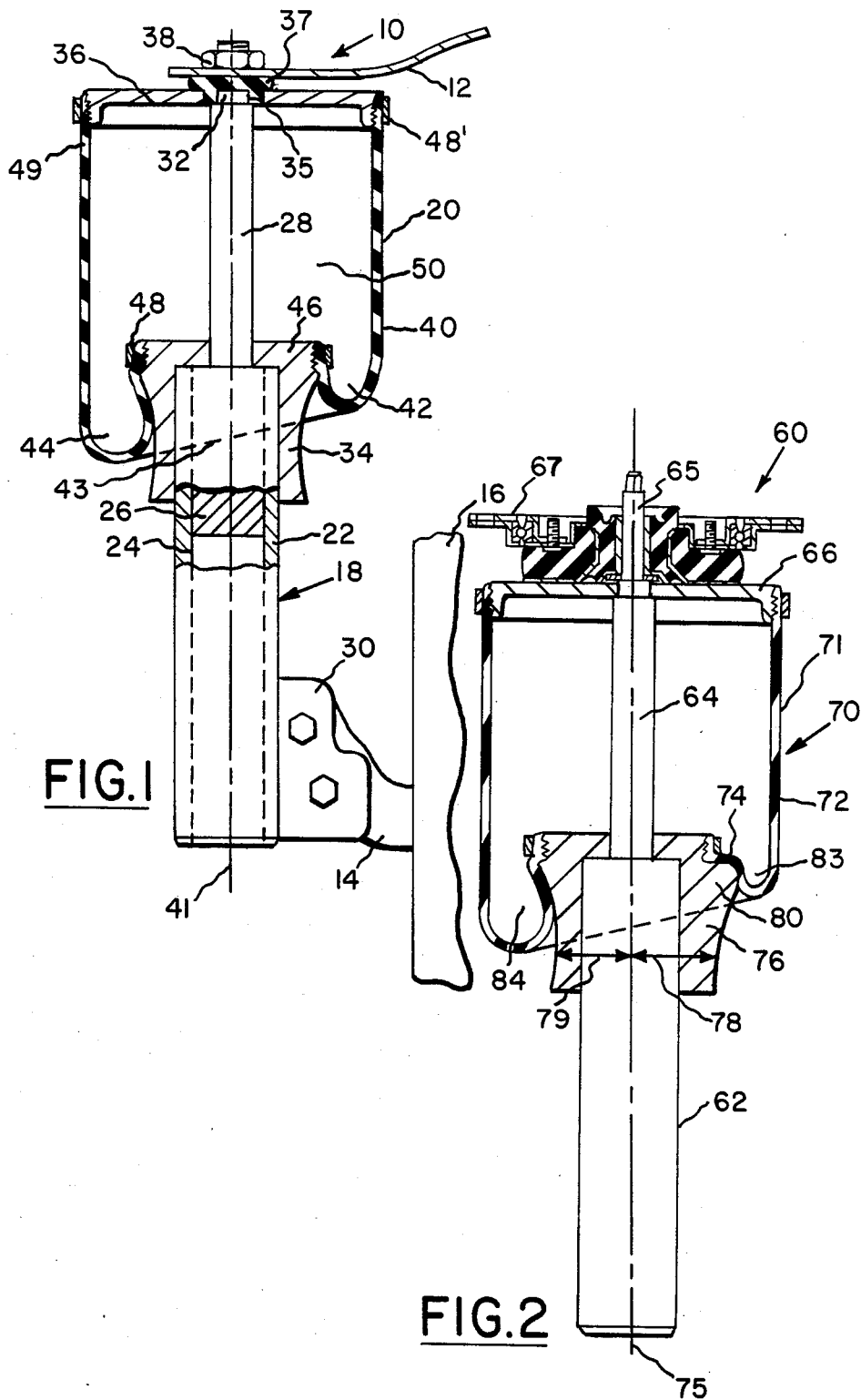
FIG. 1 is a view partially in elevation, partially cross-sectional of an air strut suspension utilizing a nonsymmetrical flexible member.
FIG. 2 is an alternative embodiment of the invention showing in partial elevation and partial cross-sectional view an air strut suspension featuring an eccentric piston.

FIG. 1 shows a simple embodiment of a suspension strut 10 which is mounted between the sprung portions 12 of the suspension and the unsprung portions 14. The strut 10 is particularly useful in a steerable suspension for an automobile in which the unsprung portion 14 is attached to the road wheel 16 and the sprung portion 12 includes the remaining portions of the chassis which must be isolated from the road shocks. The strut 10 is composed generally of a shock absorber indicated generally as 18 and an airspring indicated generally as 20. The strut 10 includes an elongated tubular body 22 within which is located an oil-filled hydraulic cylinder 24 in which is mounted an axially moveable piston 26 which has extending therefrom a piston rod 28 which is rotatably and resiliently connected to the sprung portion 12 of the chassis. The strut 10 includes a bracket 30 which connects the elongated tubular body 22 to the unsprung portion 14. In the air suspension strut 10 shown, the airspring 20 is connected between the upper end 32 of the rod 28 and the elongated tubular body 22 of the shock absorber 18. The airspring piston 34 is fixedly and rigidly mounted on the tubular body 22. An upper retainer 36 is axially spaced away from the piston 34 and provided with a means for connecting the rod 28 to the retainer 36 such as a bore 35 and nut 38 for attaching the rod 28. A simple elastomeric mount 37 dampens the torque moment between the retainer 36 and rod 28 as well as absorbing compressive stress between the sprung portion 12 and the strut 10. Other suitable mount configurations are known and their use is within the scope of this invention A key feature of this embodiment which gives the air suspension strut 10 the capability to compensate for side load is the design and construction of the airspring flexible member 40 which yields a rolling lobe or meniscuses 42 and 44 which are unsymmetrical relative to the axis 41. The term "meniscus" is used interchangeably with the art recognized term of "rolling lobe" both of which refer to the form of the flexible member 40 when viewed in axial cross section that is naturally assumed as the flexible member 40 rolls down over the airspring piston 34 during the stroke of the rod 28. In conventional symmetric airsprings, the meniscus of the airspring as it rolls over the piston is symmetrical around the center line or rotational axis of the airspring.

The unsymmetrical form of the meniscus 42 and 44 is achieved by cutting the tubular flexible member 40 at an angle relative to the axis 41. Another way of expressing this is that the flexible member is cut in a plane 43 which is non-perpendicular or oblique to the axis 41. The tapered end 46 of the flexible member 40 is sealably mounted to the upper end 46 of the piston 34. The means shown for mounting is a swage ring 48 which is compressed radially inward to sealably position the flexible member 40 against the piston 34. The opposite end 49 of the flexible member 40 is sealably affixed to the upper retainer 36 by swage ring 48'. It is understood that if the flexible member is of the beaded type which contains a sealing bead, the swage rings 48 and 48' would be unnecessary for sealably mounting the flexible member 40.

The upper retainer 36, piston 34 and flexible member 40 form a working cavity 50 surrounding the rod 28. The characteristics of the flexible member 40, the piston 34 and the volume of the cavity 50 all contribute to determine the dynamic characteristics, in particular, the spring rate of the strut 10. It is desirable for smooth ride that the spring rate of the strut be as low as practical.

Figure 4:
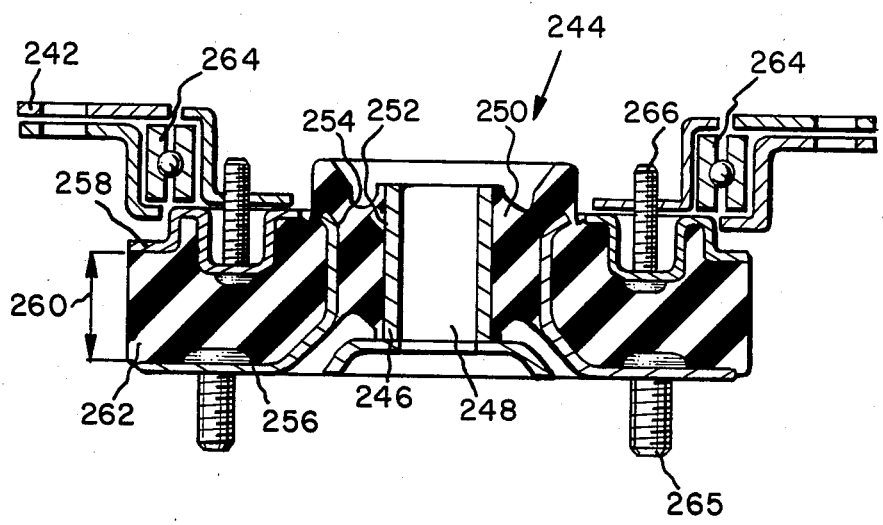
FIG. 4 is an enlargement of the mount which is the attachment means of FIG. 2 where the piston rod extends through the upper retainer of the airspring.

Referring now to FIG. 2 there is shown another embodiment of the invention in which the air suspension strut 60 achieves side load compensation. The configuration of the shock absorber portion of the strut 60 is similar in all respects to FIG. 1. The main structural element is the elongated tubular body 62 which contains a hydraulic fluid reservoir and piston which are identical to 24 and 26 respectively of FIG. 1. The rod 64 extends through the upper retainer 66 of the airspring 70 through a suitable means for absorbing torque between the rod 64 and the upper retainer 66 and a suitable means for providing cushioning between the strut 60 and the sprung portion 67 of the suspension represented by a specialized dual path mount 244 which is shown in greater detail in FIG. 4. Mount 244 provides means for pivotal movement of the strut 60 as is necessary when the strut 60 is utilized on a steerable suspension assembly. It is understood, of course, that if this strut is used in a rear or nonsteerable suspension system that the attachment means for the rod end 65 need not have a rotational means. A fixed mounting is suitable for the nonsteerable positions.

The flexible member 72 is a generally tubular reinforced rubber flexible membrane with bias-applied reinforcing fabrics 71. It may be sealably attached at both ends. The lower end 74 is, in this embodiment, of uniform axial length prior to mounting on the piston 76. It is unlike FIG. 1 where the lower portion of the flexible member 40 was cut at an angle such that the axial dimension of the flexible member around the periphery of the piston was variable. In order to achieve the side load compensating characteristic desired in this embodiment, the piston 76 when viewed in a plane perpendicular to the center line 75 of the strut 60 will generally appear egg shaped, that is relative to the axis 75, there will be a larger radius side 78 and a smaller radius side 79. This egg configuration provides a shoulder 80 on the larger radius side 78 which shortens the axial length of the meniscus 83 relative to the smaller radius side of the piston 79 which has a meniscus 84 which is of greater axial dimension. This difference in axial distance from the upper retainer 66 of each meniscus, 83 and 84, on opposing sides of the nonsymmetrical piston 76 creates a side loading force. This force is illustrated in FIG. 3 where a free body diagram showing the horizontal forces on the piston is represented.

Figure 3:
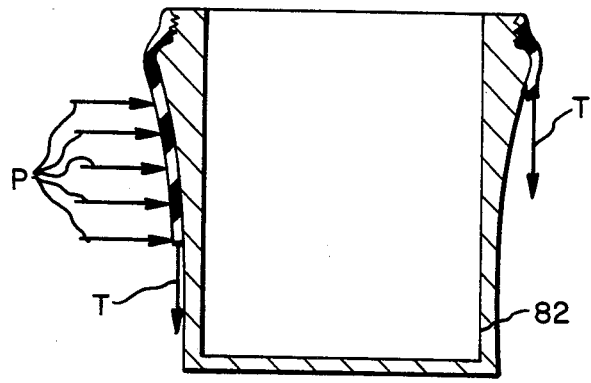
FIG. 3 is a free body or force diagram schematically showing the forces impinging on the airspring piston of this invention.

FIG. 3 represents the horizontal component of pressure vectors causing side loading force on the piston 82 of all the airsprings of this invention. This free body force diagram is representative of the force vectors for FIGS. 1, 2 and 7. These embodiments have in common a meniscus on one side of the piston which is greater in axial length than the meniscus on the radially opposite side of the piston. The pressure within the working cavity of the airspring exerts the disproportionate pressure vector P on the portion of the flexible member which has no balancing counterpart on the opposite side of the piston. The piston 82 of FIG. 3 is a schematic representation in which the actual geometrical symmetry of the sides are irrelevant to the pressure vectors shown. Thus piston 82 is representative of both piston 34 and 76 of FIGS. 1 and 2 respectively. Only the horizontal force vector P is illustrated since the flexible member is cut such that the tension T exerted by the flexible member is vertical or perpendicular to P, and does not affect the magnitude of the force vector P in the horizontal direction.

Figure 5:
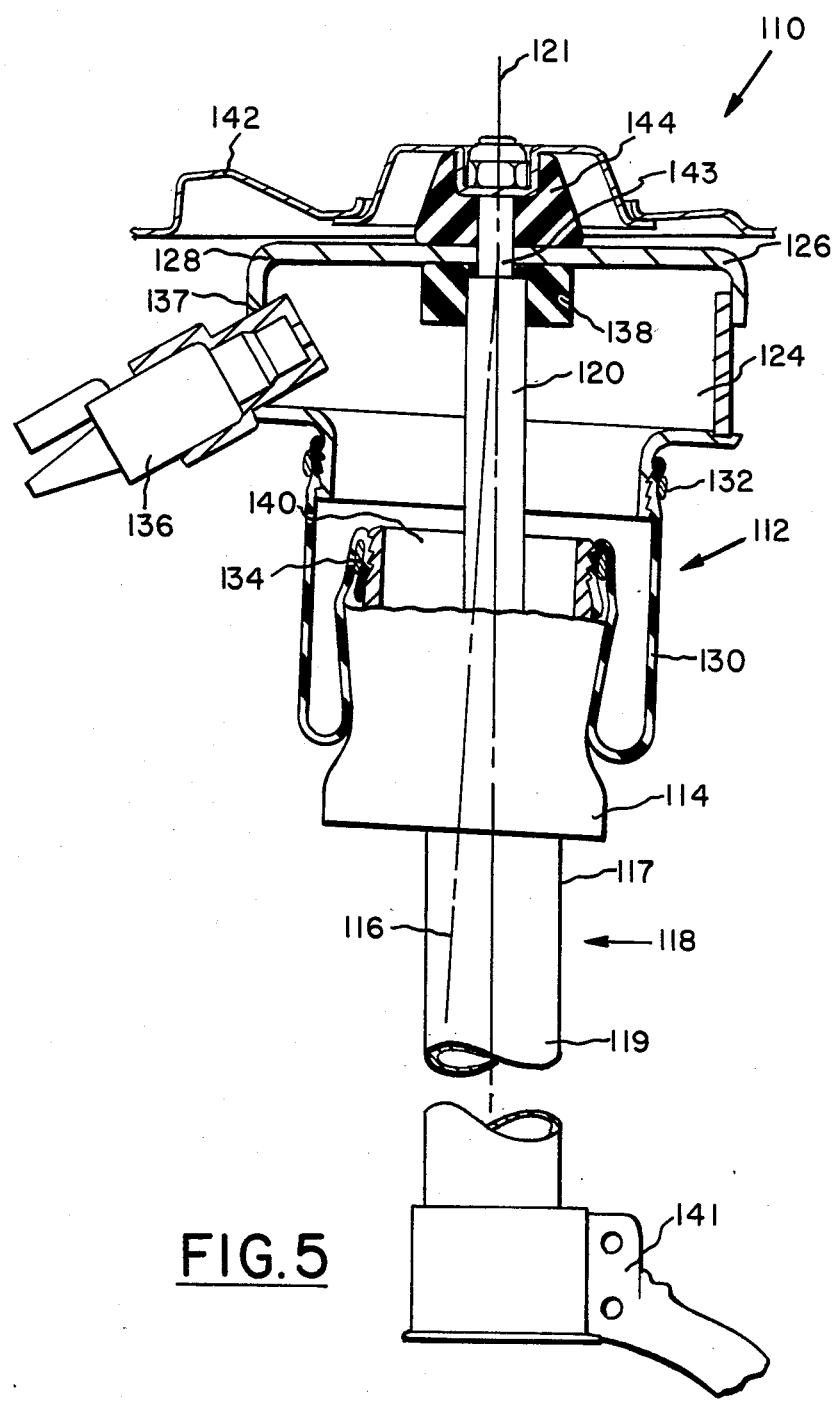
FIG. 5 is another strut embodiment in sectional view which offsets the axis of the airspring from the axis of the strut. The axes intersect at the point where the strut rod extends through the airspring upper retainer.
Figure 6:
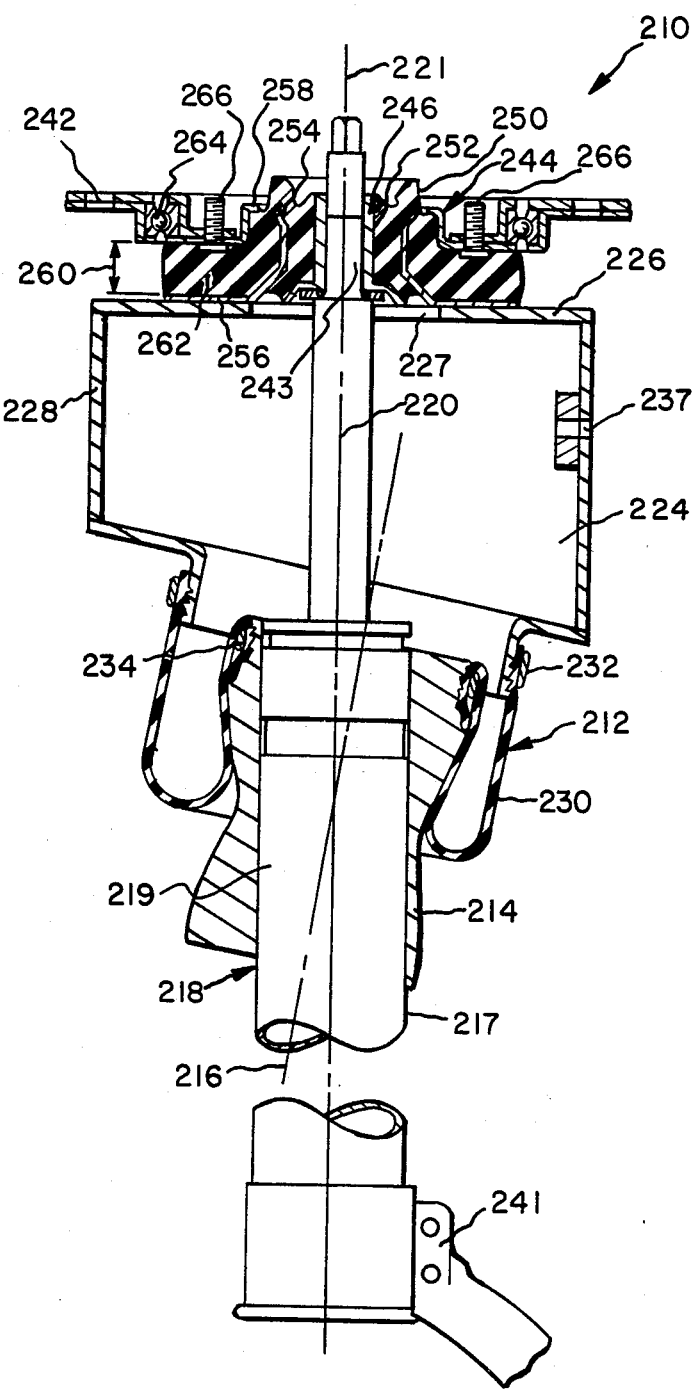
FIG. 6 is a strut embodiment in sectional view in which the airspring and shock axes are offset and intersecting at a point other than where the strut rod passes through the airspring upper retainer.
Figure 7:
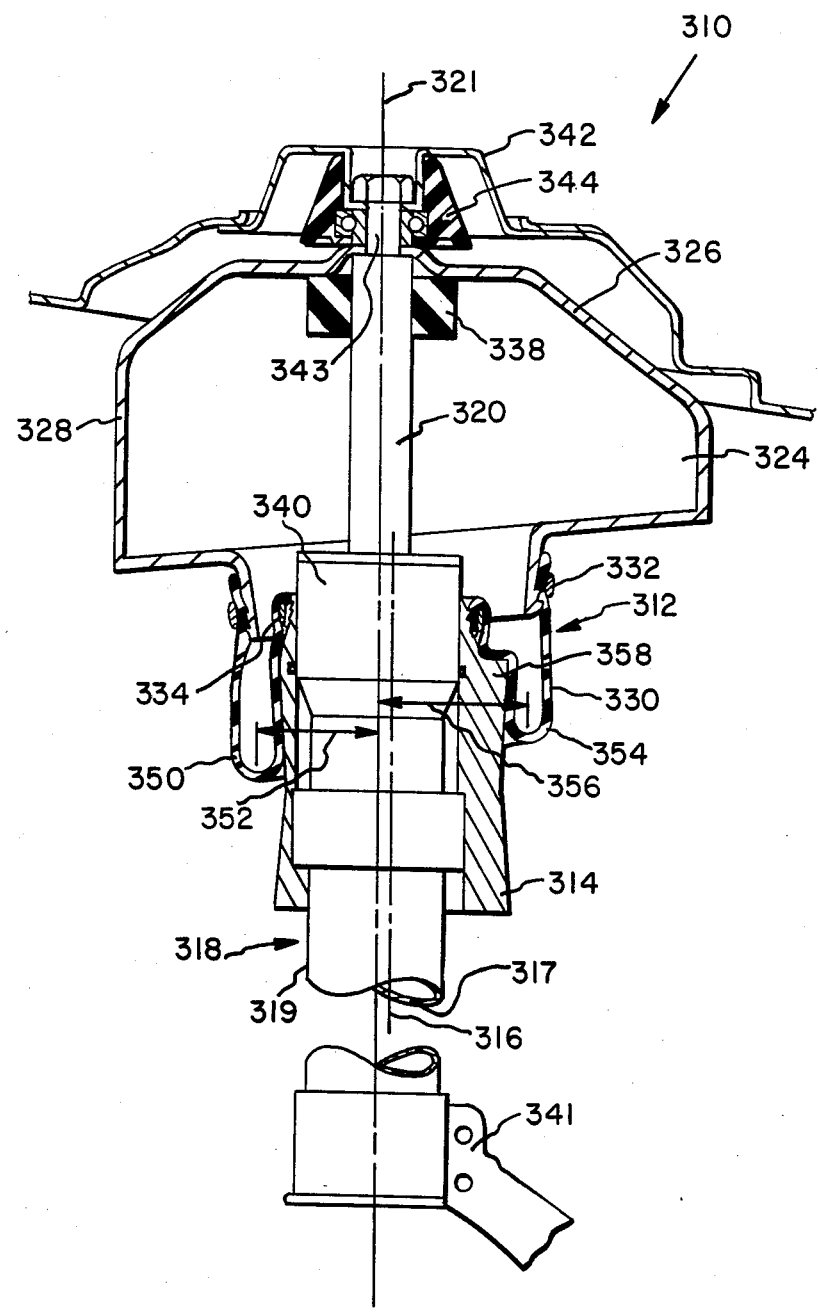
FIG. 7 is a strut embodiment featuring an eccentric airspring piston with the airspring axis offset from the axis of the strut axis.

FIGS. 5, 6 and 7 show related alternative embodiments of the invention. An air suspension strut 110,210,310 is shown which utilizes a symmetrical airspring 112,212,312 having a piston 114,214,314 which is concentric around a rotational axis 116,216,316. The piston is mounted on the tubular body 117,217,317 of the damper means 118,218,318. The damper means 118,218,318 is a shock absorber 119,219,319 in all respects similar to the one indicated generally as 18 in FIG. 1. The damper means contains a damping medium such as hydraulic fluid or oil. The rod 120,220,320 is axially movable within the outer body 116,216,316 and is connected to the damping medium through an axially movable piston similar in all respects to piston 26 of FIG. 1. The axis 121,221,321 of the strut is also defined to be the axis of the rod and the damper means. In the struts 110,210 of FIGS. 5 and 6, the axis of the airspring piston 116,216 is set at an acute angle relative to the axis 121,221 of the strut by having the airspring piston 114,214 securely fastened at the appropriate angle on the tubular body 117,217. FIG. 7 has an airspring piston 314 which is symmetric about the piston axis 316 but the piston is mounted eccentrically about the strut axis 321. Piston axis 316 and strut axis 321 are parallel but non-coincident.

The airspring establishes a sealed pneumatic working cavity 124,224,324 around the operative portion of the damping means 118,218,318. The upper retainer 126,226,326 of the airspring is integral with a volume can 128,228,328 which is a rigid structure to which the flexible air impervious membrane 130,230,330 can be sealably attached utilizing swage ring 132,232,332. The flexible membrane 130,230,330 is sealably attached at its opposite end to the upper portion of the piston 114,214,314 by swage ring 134,234,334 which establishes the enclosed volume of the working cavity 124,224,324. All the embodiments may be fitted with any suitable means for changing air pressure within the working cavity. FIG. 5 shows a pneumatic valve 136 inserted through an opening 137 in the wall of the volume can 128 to allow the inlet and exhaust of compressed air during operation of the air suspension strut 110. Any suitable means for selectively controlling the flow of gas into the working cavity may be utilized: U.S. Pat. Nos. 4,483,546 and 4,386,791 to Brearley teach a representative control system to proivde a self-leveling or "active" suspension system. Use of such control means is within the contemplation of this invention. FIG. 6 has a plugged opening 237 through which any suitable valve may be inserted if variable air pressure is a desired feature for the application. A jounce bumper 138,338 is positioned around the rod 120,320. The bumper 138,338 protects the upper portions of the strut from damage during full jounce operation. The upper portion of the piston 140,340 will impact the jounce bumper and rebound thus preventing damage. Similar bumpers may be utilized to advantage in all other embodiments of this invention.

The damper means 118,218,318 is connected to the unsprung portion 141,241,341 of the suspension by suitable attachment means. The upper retainer 126,226,326 and the rod 120,220,320 are connected to the sprung portion 142,242,342 of the suspension at an attachment point 143,243,343. In FIG. 6, the airspring axis 216 and strut axis 221 intersect at a point other than the attachment point 243 where rod 220 goes through the aperture 227 in the upper retainer 226. This divergence of the lines of action of the spring and drawer creates a torque or moment acting on the rod 220. Due to the torque or angular displacement stress which is placed on the point of attachment 243 of the rod 220 and the upper retainer 226 to the sprung portion of the suspension 242, a resilient mount 244 is utilized. The mount 244 is preferably made from resilient rubber or thermoplastic elastomer and is shown in detail in FIG. 4. It will be readily appreciated that any mounting means which functions to both absorb torque and cushion will be suitable for use in the airsprings of FIGS. 2 and 6.

FIG. 6 differs from FIG. 5 primarily in the orientation of the axis of the piston 216 relative to the rotational axis of the strut 221. In FIG. 6 the axis of the piston 216 is set at an acute angle to the axis 221 of the rod. The axis of the piston 216, when extended in an imaginary line to its intersection with the upper retainer 226 intersects at a point other than the attachment point 243. This is in contrast to FIG. 5 where the axis of the piston 116 and the axis of the strut 121 are offset at an acute angle but intersect exactly at the attachment point 143 where the upper retainer and the piston rod are fastened to the sprung portion 142 of the suspension.

In the embodiment of FIG. 6, the angular displacement or torque must be absorbed by the resilient mounting 244. This mount 244 is shown in enlarged view in FIG. 4. The following description applies to FIG. 4 and the mount 244 of FIG. 6. Mount 244 is a dual path mount having an inner member 246 adapted to receive the rod 220 through a bore 248. A first elastomeric annular ring 250 of low shear elastomer is bonded to the outer peripheral surface 252 of the inner member 246 and to the outer peripheral surface 254 of an outer support member 256 which is adapted for attachment to the upper retainer 226. A suspension attachment member 258 is spaced axially apart from said outer member 256. The space 260 between these members is filled by a second annular ring 262 of elastomeric material. The second annular ring 262 is adapted for absorbing high compression load as the suspension attachment member 258 absorbs the weight of the sprung portion 242 of the automobile. The first annular ring 250 of low shear elastomer is adapted to absorb the shear stress created during cycling of the strut 210. This first annular ring 250 of elastomer is capable of absorbing this angular motion without transmitting that motion from the upper retainer 226 of the airspring to the rod 220. The second annular ring 262 of elastomer bears the compression load between the sprung mass of the suspension and the air suspension strut 210 as it cycles through jounce and rebound during operation of the vehicle. These low frequency oscillations are damped by the second annular ring 262 of the mount 244. The mount 244 is provided with an annular bearing 264 which allows the strut 210 to rotate relative to the sprung portion 242 of the suspension. Attachment bolts 266 are provided as one means for attaching the mount to the sprung portion 242. The rod 220 of the strut projects through a bore 248 in the mount. It will be readily appreciated by one skilled in this art that any mounting means may be utilized which provides a means for absorbing torque between the upper retainer 226 and the rod 220 while still providing for a means for absorbing compressive force between the sprung portion of the suspension 242 and the strut 210. Many designs for such mounting means are known and many others may be contemplated or designed to serve the function of mount 244 in any embodiment of this invention. Such mounts are preferably employed in struts according to FIGS. 1, 2, 6 and 7.

FIG. 7 embodies yet another aspect of the invention in which the side load compensating force is delivered by the airspring due to a nonconcentric mounting of the piston around the tubular outer body 317 of the damper 318. The axis of the piston 316 lies generally parallel to the axis of the strut 321. Unlike FIGS. 5 and 6, the axis of the piston is not set at an angle to the axis of the rod. The piston 314 is eccentric about the axis 321 of the strut. This eccentricity of the piston creates a nonsymmetric form to the rolling lobe of the flexible member 330. This is similar in function to the embodiment shown in FIG. 2. The side load compensating force is created as shown in the free body diagram of FIG. 3 by the unbalanced meniscus form of the nonsymmetric flexible member. The meniscus 350 on the smaller radius side 352 yields a greater force on the smaller radius side 352 of the piston 314. FIG. 7 shows a short meniscus 354 on the larger radius side 356. The shoulder 358 provided in the larger radius side of the nonsymmetric piston 314 further shortens the meniscus 354. The shoulder 358 is gradually blended into the radius of the piston 314 until the shoulder is very slight on the smaller radius side 352 of the piston. It should be noted that the eccentric piston with or without the shoulder 358 is effective to create side loading force during operation of the airspring. The shoulder 358 simply provides a greater side loading force and may be preferred in particular applications requiring greater force compensation. Since the line of action of the airspring and the damper 118 or shock absorber are substantially coincident in this embodiment, a simple resilient mount 344 is provided where the rod 320 and upper retainer are fastened to the sprung portion 342 of the suspension at the attachment point 343. This elastomeric mounting means provides for pivotal or swivel-type movement of the rod 320 relative to the sprung portion 342.

Figure 8:
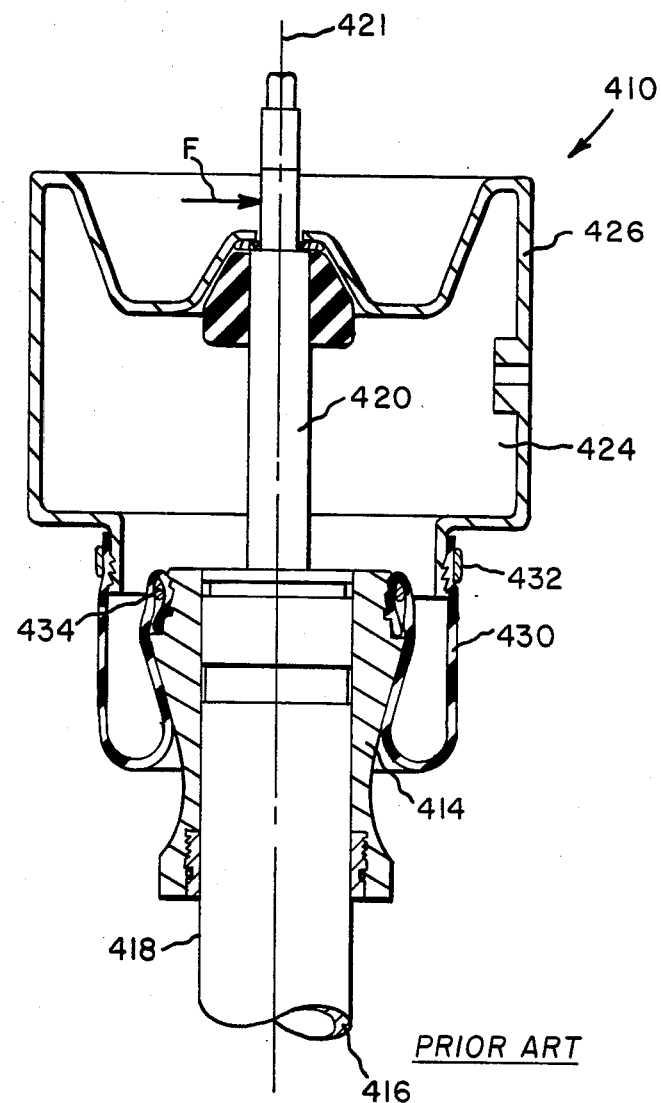
FIG. 8 is a representation of a prior art strut having an airspring mounted such that the axis is coincident with the strut axis.

FIG. 8 represents a conventional air strut 410 which incorporates a conventional shock absorber 418 with a shock rod 420 extending axially outward from the outer body 416. Securely fastened concentrically around the outer body is a piston 414 which is mounted such that the axis of rotation of the piston is exactly coincident with the axis of rotation 421 of the shock absorber and rod. The flexible rubber member 430 is sealing attached to the piston 414 and at the opposite end to a volume can 426 by swage rings 432,434 to form the internal pneumatic working cavity 424. This inline symmetric airspring strut suspension member exhibits no side loading force capability which makes it unlike the suspension members of this invention. The lack of side loading capability manifests itself during operation of the strut in the suspension system by the tendency of the piston within the shock absorber to bind. This binding is due to angular force F exerted on the shock rod 420. This binding of the hydraulic piston within the shock absorber is described as stiction and manifests itself most noticeably during low amplitude and low frequency oscillation of the strut suspension. The stiction becomes more pronounced as the force or load is delivered at greater angles compared to the axis of the strut.

COMPARATIVE TEST RESULTS

Side load compensation capabilities for an airspring of this invention as represented by FIG. 6 was compared on an MTS tester to determine the degree of side load compensation evidenced by the reduction in friction during cycling. The MTS tester cycles the suspension strut at a fixed frequency from full rebound through full jounce in each cycle. The results of the comparison of a conventional inline airspring strut configuration as shown in FIG. 8 was compared with the angled airspring to strut axis of FIG. 6. Referring now to the results in Table I, particular attention is drawn to the friction category where a load was applied at a 7° angle at the frequencies of 0.01 and 0.5 hz and the friction measured. The air suspension strut of FIG. 6 demonstrated 38% lower friction than the conventional inline strut of FIG. 8. At 0.5 hz the reduction is predictably reduced but still significant at 15%. Table I describes a test to dynamically measure the degree of friction inherent in a side loaded strut.

A simple test was devised which measured the amount of stiction in a static condition by mounting air struts made in accordance with FIG. 8 on a vehicle.

The front end of the vehicle was pulled up and released. It was allowed to come to rest and then the exact height of the sprung portion of the suspension was measured to yield the value shown under the column listed as "Pull Up" in Table II. The column labeled "Push Down" was obtained by exerting sufficient downward pressure on the sprung portion of the car to put the strut into full jounce and then releasing it and measuring the height of the sprung portion once it came to rest. The difference between the "Pull Up" and "Push Down" values of column 1 and 2 is termed the Deadband Distance reported in the third column of Table II.

The same car was then equipped with an airspring of this invention similar in all respects to FIG. 6 where the airspring is angled relative to the strut axis and the same measurements were taken and are shown under the appropriate columns of Table II. The deadband measurements shown in column 3 illustrate clearly that the air strut suspension of this invention reduces the tendency of the hydraulic piston to bind in the shock absorber during very low frequency undulations of the suspension.

The concentric conventional airspring strut assembly of FIG. 8 has a deadband of 5-6 cm. The side load compensating airspring of FIG. 6 yielded a deadband of only 1-2 cm. The kind of test results on dynamic and static type testing of stiction and side load compensating characteristics translate generally to a softer ride. The test results of Tables I and II show that the struts of this invention overcome the stiction problem of conventional inline air strut configurations. The airspring suspension member of this invention further provides the ability of the suspension to be tuned to particular desired ride characteristics. The strut may be inflated to higher pressures in the working cavity to compensate for higher vehicle loading and thereby maintaining a consistent vehicle height. A lower spring rate is obtainable and a variable spring rate is possible by utilizing varying pressures within the pneumatic working cavity of the airspring of the suspension member of the suspension strut.

Additional Embodiments

If larger magnitudes of side loading force are desired, various features of the illustrated embodiments may be combined in a single strut. For example, the flexible membrane which is cut in a plane oblique or non-perpendicular to the axis of the flexible membrane may be utilized with the offset piston of FIGS. 5 or 6 or the eccentric pistons of FIGS. 2 and 7.

Preferred embodiments of the invention have been shown and described for illustration purposes. It will now become apparent to those skilled in the art that various changes in the form and detail may be made without departing from the scope of the invention. Accordingly, the scope of the invention is set forth in the following claims.

TABLE I

|  | FIG. 8 AIRSPRING CONCENTRIC WITH STRUT AXIS | FIG. 6 AIRSPRING ANGLED TO STRUT AXIS |
|---|---|---|
| Load | 3.9 kN | 3.9 kN |
| Spring Rate @ .5 hz | 7.7 kN/m | 9.9 kN/m |
| Natural Frequency @ .5 hz | 42 CPM | 56 CPM |
| Side Load |  |  |
| @ .01 hz | 0 N | 227 N |
| @ .5 hz | 0 N | 187 N |
| Friction 7° Load Angle |  |  |
| @ .01 hz | 300 N | 187 N |
| @ .5 hz | 787 N | 672 N |

TABLE II

| STICTION MEASUREMENT ON CAR | | | |
|---|---|---|---|
|  | Pull Up | Push Down | Deadband Width |
| *FIG. 8 - Airspring Concentric to Strut Axis |  |  |  |
| Right Front | 32 cm | 27 cm | 5 cm |
| Left Front | 33 cm | 27 cm | 6 cm |
| **FIG. 6 - Airspring Angled to Strut Axis |  |  |  |
| Right Front | 18 cm | 16 cm | 2 cm |
| Left Front | 17 cm | 16 cm | 1 cm |

*Measured from hub cover
**Measured from wheel rim

What is claimed is:

1. A suspension strut for connecting a sprung portion and an unsprung portion of a suspension and providing a side load compensating force to counter balance side loading force created by said sprung portion comprising:
   (a) a damper means including a body containing an oil filled reservoir mounted in said body, a piston mounted for coaxial reciprocal movement in said body having a rod connected to said piston extending upwardly from said body, said body being concentric about a rotational axis of said damper means and connected to said unsprung portion of said suspension, said rod being connected to said sprung portion of the suspension at an attachment point; and
   (b) a nonsymmetrical airspring operatively mounted surrounding said damper means to form a sealed pneumatic working cavity therearound, said nonsymmetrical airspring including an airspring piston having a generally egg-shaped radial cross section with a small radius portion and a larger radius portion being centered on the rotational axis of said damper means and being sealingly attached to said body of said damper means such that the airspring piston is eccentrically mounted about the rotational axis of said damper means, and an upper retainer axially spaced apart from said airspring piston by a tubular flexible member forming a rolling lobe of unequal axial length as the flexible member rolls axially downward over said airspring piston to provide the side load compensating force to counter balance the side loading force created by the spring portion of the suspension, said pneumatic working cavity being formed by a first end of said tubular flexible member being sealably secured to said upper retainer and a second end of said tubular flexible member being sealably secured to said airspring piston, said upper retainer being connected to said rod proximate said sprung portion of said suspension.

2. A suspension strut according to claim 1 further comprising: a means for mounting said strut to said sprung portion of the suspension positioned at the attachment point and including a means for absorbing torque between said upper retainer and said rod and a means for cushioning between the sprung portion of the suspension and the upper retainer.

3. A suspension strut according to claim 1 further comprising a means for changing air pressure within said working cavity.

4. A suspension strut according to claim 1 wherein said upper retainer includes an integral volume can portion.

5. A suspension strut according to claim 1 wherein said attachment point is an elastomer mounting means providing for limited pivotal movement of said rod relative to said sprung portion.

6. A suspension strut according to claim 1 wherein said airspring piston is provided with a shoulder in the larger radius side extending radially outward from said larger radius portion, said shoulder gradually dimnishing in radial dimension on said smaller radius portion of said piston, said shoulder serving to create a greater side load compensating force by greater deformation of said tubular flexible member as said member rolls axially on said airspring piston.

7. A suspension strut for connecting a sprung portion and an unsprung portion of a suspension and providing a side load compensating force to counter balance side loading force created by said sprung portion comprising:

(a) a dampler means including a body containing an oil filled reservoir mounted in said body, a piston mounted for coaxial reciprocal movement in said body having a rod connected to said piston extending upwardly from said body, said body being concentric about a rotational axis of said damper means and connected to said unsprung portion of said suspension, said rod being connected to said sprung portions of the suspension at an attachement point;

(b) a nonsymmetrical airspring operatively mounted surrounding said damper means to form a sealed pneumatic working cavity therearound, said nonsymmetrical airspring including an egg shaped airspring piston sealingly attached to said body of said damper means such that the airspring piston is eccentrically mounted about the rotational axis of said damper means to provide the side load compensating force to counter balance the side loading force created by the sprung portion of the suspension, and an upper retainer axially spaced apart from said airspring piston by a tubular flexible member, said pneumatic working cavity being formed by a first end of said tubular flexible member being sealably secured to said upper retainer and a second end of said tubular flexible member being sealably secured to said airspring piston forming a rolling lobe of unequal axial length as the flexible member rolls axially downward over said airspring piston to provide the side loading force created by the spring portion of the suspension, said upper retainer being connected to said rod proximate said sprung portion of said suspension; and (c) a dual path mount having an inner member adapted to receive said rod of said damping means and an outer member spaced radially away from said inner member adapted to attach to the sprung portion of said suspension and to said upper retainer of said airspring, a first annular ring of low shear elastomer positioned and bonded between said inner member and said outer member, a second annular ring of high compression elastomer bonded to said outer member; and wherein said upper retainer is fixedly attached to said outer member and said sprung portion of the suspension is fixedly attached to said outer member such that said second annular ring of high compression elastomer lies substantially between the upper retainer of the airspring and the sprung portion of the suspension and wherein said first annular ring of low shear elastomer is the means for absorbing torque and said second annular ring of high compression elastomer is the means for cushioning.

* * * * *